May 29, 1951  W. H. KEEFER  2,555,089
DIRECT-INDIRECT FLUORESCENT LUMINAIRE
Filed Sept. 1, 1945  3 Sheets-Sheet 2

INVENTOR.
William Hobart Keefer
BY
Thomas J. P. O'Brien
Atty.

May 29, 1951 W. H. KEEFER 2,555,089
DIRECT-INDIRECT FLUORESCENT LUMINAIRE
Filed Sept. 1, 1945 3 Sheets-Sheet 3
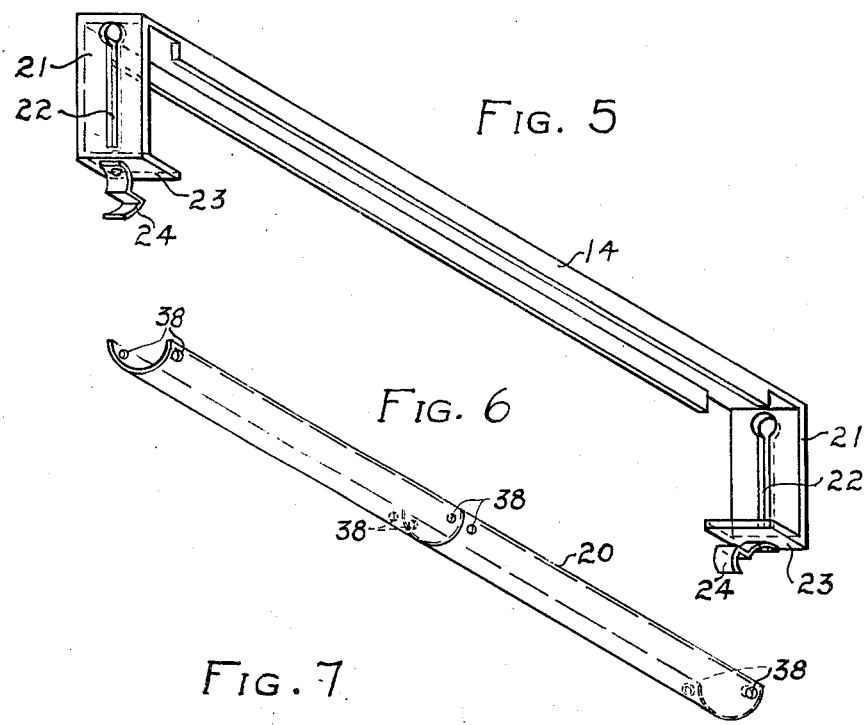
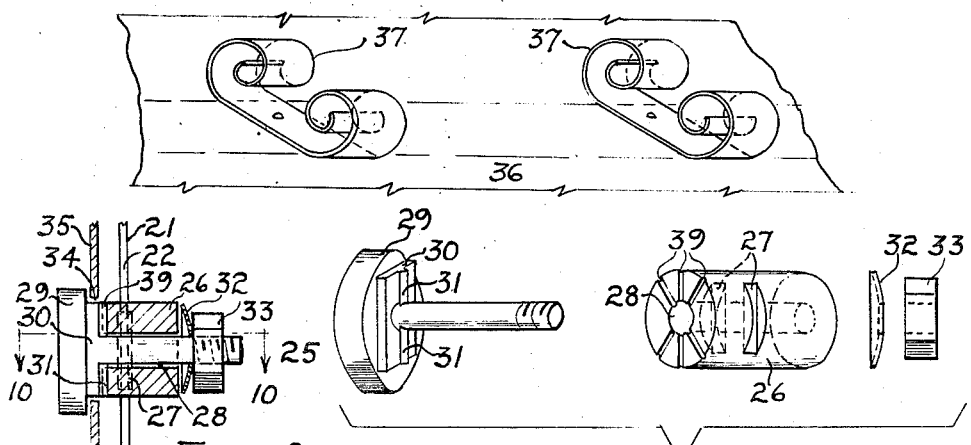
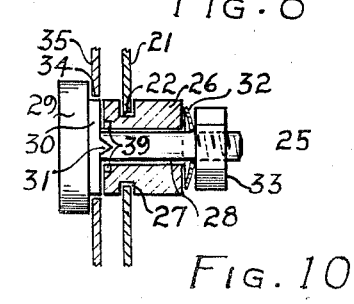
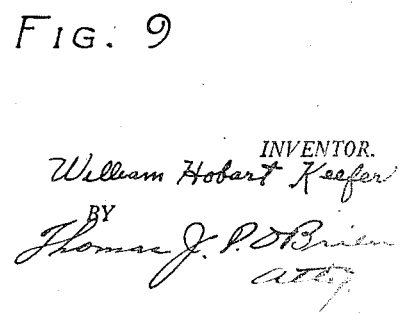
INVENTOR.
William Hobart Keefer
BY
Thomas J. P. O'Brien
Atty Patented May 29, 1951

2,555,089

UNITED STATES PATENT OFFICE 2,555,089

DIRECT-INDIRECT FLUORESCENT LUMINAIRE

William Hobart Keefer, Baltimore, Md.

Application September 1, 1945, Serial No. 613,991

6 Claims. (Cl. 240—51.11)

This invention relates to new and useful improvements in artificial light luminaires adapted to a tubular light source, with particular reference to improved features of construction in totally enclosed direct indirect luminaires, primarily as they affect maintenance and the operating characteristics of the tubular light sources in their mounted position in fixed relation with ballasts and reflectors and by effectively sealing them against an accumulation of dust and dirt in a dust-free atmosphere of still air having a minimum ambient temperature change around the tubular light sources when the closure sections are fully closed yet being easily accessible for maintenance and servicing of all enclosed parts and exteriorly mounted ballasts without dismantling any of the closure elements.

Another object of this invention, is to provide a totally enclosed artificially lighted luminaire wherein the freedom from dust and dirt accumulation on the reflecting and diffusing surfaces of the luminaire provides the means for prolonging the period of maximum distribution and penetration of light, out through the closure, from the enclosed plurality of tubular sources of light.

A further object of this invention is to provide a totally enclosed artificially light luminaire construction wherein the most efficient operation of the ballast is made possible by mounting it outside the luminaire closure in completely open circulating air; for maximum heat loss from all surfaces of the ballasts and a minimum temperature rise in the enclosed tubular light sources.

A still further object of this invention, is to provide a totally enclosed artificially lighted luminaire construction wherein any maintenance time and labor required is greatly reduced by a combination of elements modifying the action of each other in a sequence of simplified servicing operations.

Further objects and advantages will be apparent from the following description and claims taken in conjunction with the drawings in which;

Figure 5 is an isometric view of rigid supporting horizontal channel means for the luminaire;

Figure 6 is an isometric view of a reflector cover plate rigid supporting the horiozntal channel means;

Figure 7 is a fragmentary view of the tube retaining means for securing tubes along the interior of the bottom closure section lengthwise of the longitudinal axis;

Figure 8 is a fragmentary cross sectional view on an enlarged scale of the self-locking pivotal means for the bottom closure section;

Figure 9 is a disassembled view on an enlarged scale detail of parts shown in Figure 8, and Figure 10 is a horizontal sectional view on the line 10—10 of Figure 8.

Figure 1:
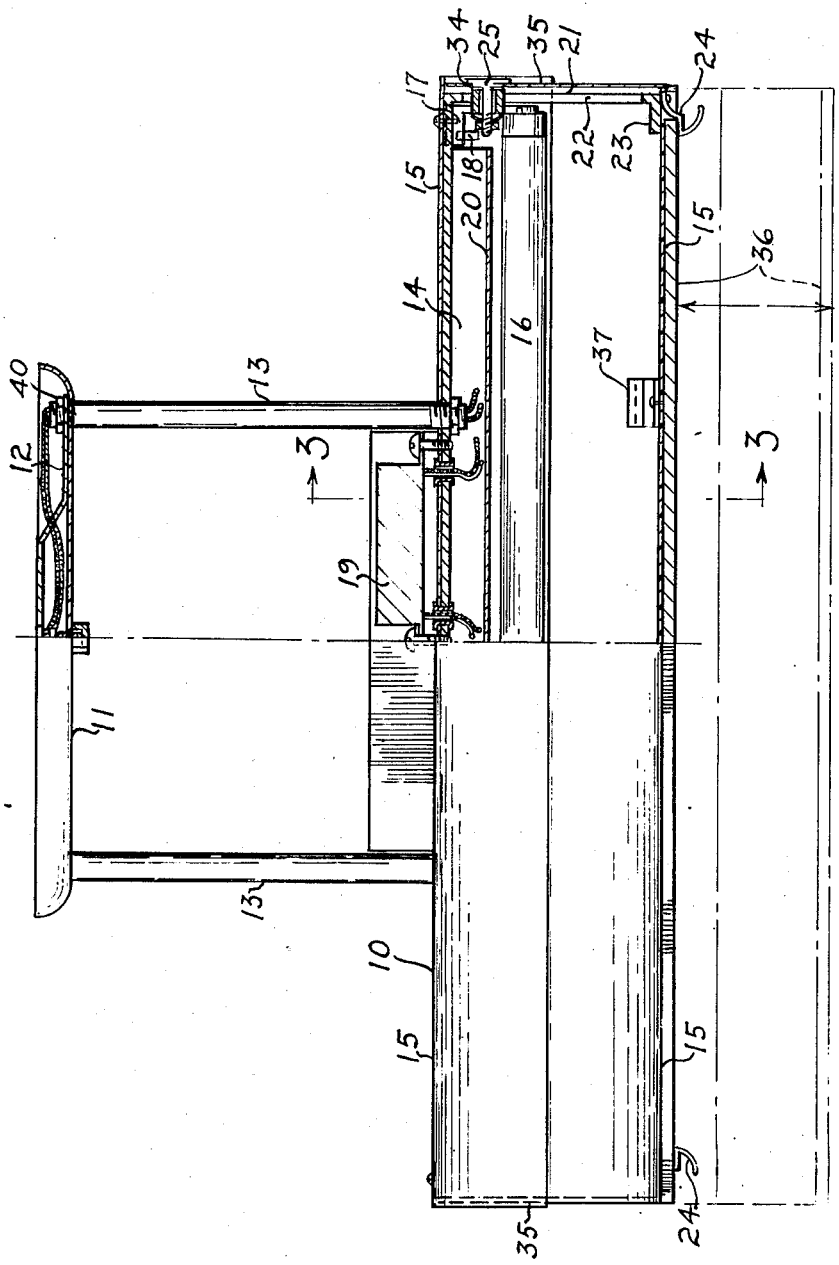
Figure 1 is a view, the left side half being in side elevation and the right side half being partly in vertical cross section, of a totally enclosed artificially lighted luminaire embodying this invention.
Figure 2:
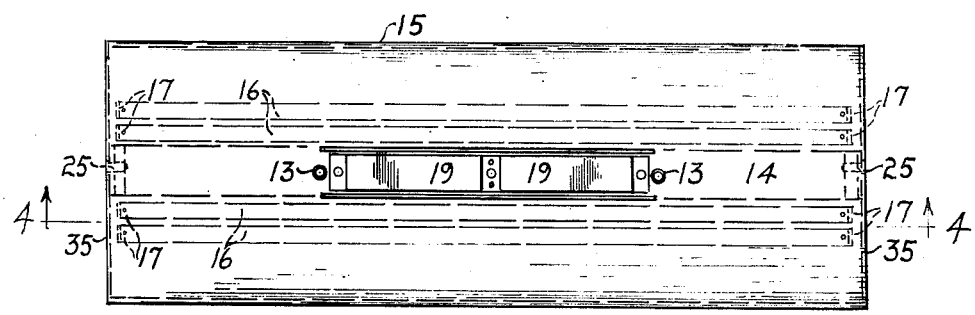
Figure 2 is a top plan view of part of the luminaire as shown in Figure 1.

As shown in Figure 1 of the drawings, 10 in general, a conventional form of artificial light luminaire embodying a ceiling canopy 11 covering the ceiling mounting strap 12 having necessary fittings, it being understood that all necessary wiring needed for properly connecting electrical parts of the luminaire are provided within the conduits or suspension rods 13 and within the rigid horizontal supporting channel 14, said conduit or suspension rods 13 being provided with threads and a nut 40 or similar means on their upper ends and being threaded on their lower ends for taking necessary nuts to securely fasten said conduits or suspension rods 13 after passing at their upper ends to the canopy 11 and their lower ends to the channel 14 through openings provided in the rigid horizontal supporting channel 14. The rigid horizontal supporting channel 14, being substantially mounted and being contained within the translucent closure 15, rigidly supporting the closure 15 and through the top section of the closure 15 also indirectly supports the tubular light sources 16, four in the present instance, the necessary sockets 17, and the starters 18 which are hung from the top section of the closure 15. The channel 14 directly supports also the ballasts 19, the removable channel cover 20, the channel end sections 21, which depend substantially at right angles to the rigid horizontally supporting channel 14 and which have rectangularly elongated vertical openings 22 and which have inwardly turned end section portions 23, which portions 23 have spring clips or similar means 24 secured on their undersides by means of rivet or similar means.

The rectangularly elongated vertical slots 22 in the channel end sections 21 are adapted to be slidably engaged upwardly and downwardly by means of a pivotal means indicated generally at 25, consisting of a cylindrical pivot supporting member 26 having recess 27 on each side adapted to permit of free and slidable engagement within slot opening 22 while preventing their rotation, and the outer end surface of the cylindrical pivot supporting member 26 are provided with radially extending grooves 39 or similar means. The cylindrical pivot supporting members 26 have a longitudinal center opening or base 28 therethrough which permits insertion of pivotal bolt 29 freely through the openings or bases 28 assuring that the pivotal bolt 29 may turn freely and independently in the cylindrical pivot supporting member base or opening 28. The pivotal bolts 29 have a square part 30 at the head end adapted to be closely inserted into the square openings 34 provided in the end sections 35 of the closure 15, so that the bottom section of the closure 15 will at all times partake of the same movements as the pivotal bolts and by such movements be held substantially in either a fully closed, intermediate, or fully opened position. The square part 30 of each pivotal bolt 29 has as shown in Figure 9 a ridge 31 or similar means adapted to frictionally engage successively in the extending grooves 39 on the outer end surface of the cylindrical member 26 when the pivotal bolts are rotated relative to the members 26.

A spring type lock washer 32 is disposed around pivotal bolts 29 at their threaded ends between the pivotal bolt nuts 33 therefor and the other inner end of the cylindrical pivot supporting member 26, which assures a yieldably connected engagement between those parts of pivotal means 25, said spring type lock washer 32 providing the necessary reactive tension thereby permitting pivotal bolt 29 to provide primarily, a desired releasable self-locking means for the pivotal movement of the bottom section 36 of the closure 15. The rigid horizontal supporting channel 14, has its removable reflector channel cover 20 in two sections which may be easily inserted or sprung into place on the underside of the rigid horizontal supporting channel 14 by making use of openings 38 or other means for frictionally securing channel cover in the desired closed position. The ballasts 19 are mounted on the rigid horizontal supporting channel 14 but exteriorly of the top of the translucent closure 15 substantially as shown in Figure 1, being secured by means of screws passing through openings in the translucent closure top section especially adapted for such screws. Wiring from ballasts 19 enter the space within the rigid horizontal supporting channel through bushed openings in suitable manner. The retractably displaceable bottom closure section 36 has thereon and spaced from each other across its interior longitudinal axis, scroll-like coils 37 of substantially uniform width throughout their entire length, these being secured to the bottom section 36 by rivets or similar means as in Figure 7.

Figure 3:
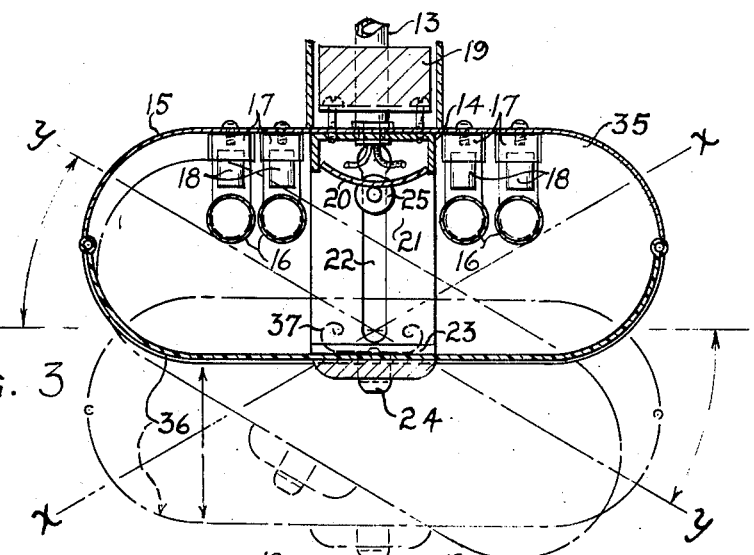
Figure 3 is a vertical transverse cross sectional view taken substantially upon the line 3—3 of Figure 1.
Figure 4:
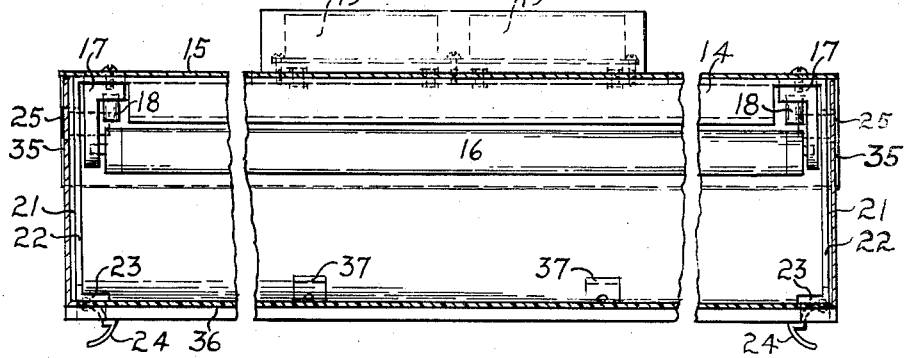
Figure 4 is a longitudinal vertical section view taken substantially upon the line 4—4 of Figure 2.

Referring to the drawings in detail, with the construction shown, it will be apparent that in the above described totally enclosed direct-indirect artificially lighted luminaire, when spring clamps 24 or similar means are released the retractably displaceable bottom closure section 36 moves by gravity to an intermediate open position as shown by dotted line in Figure 1 and Figure 3. For providing the maximum access to the interior of the luminaire closure the bottom closure section 36 may be easily swung forwardly or rearwardly on pivotal means 25 to fully opened position.

New tubular light sources 16 necessary for relamping the luminaire will be in place in the scroll-like coils 37 on the bottom closure 15, the scroll-like coils 37 securely holding at all times said new tubular light sources 16. When servicing and maintenance operations have been finished, old tubular light sources to be discarded are removed, leaving new tubes stored in the tube retainer lengthwise of the bottom closure section's longitudinal axis, and the bottom closure section 36 is then easily raised into fully closed position where it is securely held in place by the spring clamps 24, which upon passing through openings in the bottom closure section exert an upward pressure on the exterior of bottom closure section 36 as shown in Figure 1. To insure maximum output of useful light by keeping the fluorescent luminaires cleaned and relamped is the major maintenance problem of all lighting luminaires. With the applicant's totally enclosed direct indirect luminaire, the time and labor required for cleaning it is reduced to a minimum; the time and labor required for relamping it is reduced to a minimum by keeping new tubes stored in the scroll-like coils 37 on the horiozntal axis of interior of the luminaire where they are readily available for quickly replacing burned out tubes; meanwhile saving time, labor and storage space elsewhere.

Although one embodiment of the invention has been herein illustrated and disclosed, it will be evident to those skilled in the art that various modifications may be made in the details of construction without departing from the principles herein set forth.

I claim:

1. A totally enclosed luminaire comprising; a main supporting member for a lamp; a dustproof closure comprising a stationary upper translucent top closure section and a lower separable translucent bottom closure section, lamp supports and electrical connections for the lamp, all carried by the main supporting member; said upper and lower sections together completely surrounding and enclosing the main supporting member and the lamp with the supports and electrical connections inside the same when fully closed; a plurality of spaced mounting means for the lower closure section, each adapted for retractable gravitational displacement of the lower closure section, relative to the stationary upper closure section; releasable spring latching means for latching the lower closure section in its normal closed shading position and releasable from the exterior thereof; and a ballast for the lamp carried by said main supporting member exteriorly of the closure immediately over the outer surface of the top closure section, said ballast being exposed on all its sides to the atmosphere for free circulation of atmospheric air around and over its entire surfaces for cooling the same and conducting heat thereof away in a manner to avoid flow of heat to the lamp closure and its interior, thereby providing in conjunction with the dust proof closure, a dust-free atmosphere of still air having a minimum ambient temperature change around the lamp when closure sections are fully closed, with ready and easy access for maintenance and servicing the enclosed parts and the ballast without dismantling the closure elements.

2. A totally enclosed luminaire comprising, an upper translucent top closure section and a lower gravitationally separable translucent bottom closure section; a main supporting member for the luminaire arranged within the area of the top closure section and supporting the same in fixed relation therewith and having spaced extensions depending into the lower closure section; means on the lower closure section and on the extensions for rectilinear gravitational separable retraction, and reverse closing movement of the lower closure section relative to the top closure section; spring latching means accessible for release from the exterior of the lower closure section, for latching the lower closure section in closed position and releasable for effecting said rectilinear gravitational retraction of the lower closure section; means for the rotation of the lower closure section to different positions about an axis perpendicular to the depending extensions, in the rectilinearly retracted position of the lower closure section; self-locking means for automatically holding the lower closure section in various different positions upon its said rotation; and a ballast and electrical connections and lamp supports for a lamp in the luminaire; the ballast being disposed exteriorly of the closure immediately over the fixed closure section and being supported by the main supporting member below in the upper closure section so as to be exposed on all sides to the atmosphere for free circulation of cooling air with avoidance of heat conducting contact with the rest of the luminaire, and the electrical connections and the lamp supports being contained within the area of the upper closure section to thereby provide both ready access thereto from below, when the lower closure section is retracted by gravity, and a dust free atmosphere of still air having a minimum ambient temperature change around the lamp, when the lower closure section is fully closed.

3. A lighting fixture for fluorescent lamps, comprising a separable dust-proof lamp housing having a fixed upper closure section and a separable lower translucent closure section together forming a fully enclosed housing, a main supporting member for the fixture disposed within the top closure section, adjacent the center of the top thereof, and in a fixed relation thereto and having fixed projections depending down into the bottom closure section for supporting the latter, a ballast arranged exteriorly above and out of contact with the top surface of the upper closure section and provided with supporting leading connections to the main supporting member for support of the ballast and leading of electrical wires into the housing, lamp supports secured within the upper closure section for support of a fluorescent lamp therein below the main supporting member and to which the electric wires are to be connected, a slot in each projection depending from the main supporting member into the bottom closure section, a non-rotatable bearing in sliding engagement in each slot, a pin rotatably mounted in each bearing and fixed to the bottom closure section, spring means on said pin urging each bearing into engagement with parts fixed to said bottom closure section, for holding the bottom closure section in any position it rotates to, when rotated on its pivot pin about said bearing; and spring clips attached to the projection depending from the main supporting member into the bottom closure section for latching the latter in enclosed position, said clips extending outside the bottom closure section in its closed position for access in releasing the same from the exterior thereof.

4. Apparatus as claimed in claim 3, and which includes spring scroll-like coils secured to the inside of the lower closure section along its longitudinal axis for retaining lamps in a position close to the upper closure section for use in replacing lamps, in the lamp supports, in the upper closure section of the housing.

5. A fluorescent luminaire construction, comprising, a main supporting member for a lamp; lamp supports and electrical connections for the lamp and a multipart closure carried by the main supporting member; said multipart closure for the lamp and main supporting member comprising a lower separable light diffusion closure section and a companion upper fixed closure section together completely surrounding and sealing against infiltration of dust, when fully closed, the main supporting member and the lamp with the supports and electrical connections therefor; a plurality of spaced pin and slot connections between the main supporting member and the lower separable closure section for separable closure of the lower separable light diffusion closure section with its companion upper fixed closure section, each said connection comprising a downwardly extending slot and a pin, said pin riding in the slot and having a rotatable pivot and a non-rotatable member; spring latching means for latching the lower separable light diffusion closure section in its closed position; and self-locking means for locking the same in various adjusted positions, when rotated about the pivot in the separated open position of the lower separable light diffusion closure section, upon release of the latching means, operable to opened and closed positions.

6. A fluorescent luminaire construction, comprising, a main supporting member for a lamp; lamp supports and electrical connections for the lamp and a separable light diffusion lamp closure carried by the main supporting member; the separable light diffusion lamp closure and a companion fixed closure section together completely surrounding the main supporting member and the lamp with the supports and electrical connections therefor, a plurality of spaced pin and slot connections between the main supporting member and the lower separable closure section for separable closure of the separable light diffusion lamp closure, each said connection comprising a downwardly extending slot and pin, said pin riding in the slot and having a rotatable pivot and a non-rotatable member; spring latching means for latching the lower separable lamp closure in its closed position, and self-locking means for locking the separable lamp closure in various adjusted positions, when rotated about the pivot in the separated open position, upon release of the spring latching means therefor.

WILLIAM HOBART KEEFER.

REFERENCES CITED

The following references are of record in the file of this patent:

UNITED STATES PATENTS

| Number | Name | Date |
| --- | --- | --- |
| 2,232,499 | Waterbury | Feb. 18, 1941 |
| 2,268,731 | Van Bloem | Jan. 6, 1942 |
| 2,271,679 | Claspy | Feb. 3, 1942 |
| 2,293,117 | Claspy | Aug. 18, 1942 |
| 2,319,732 | Guth | May 18, 1943 |
| 2,329,435 | Colucci | Sept. 14, 1943 |
| 2,346,717 | Ainsworth | Apr. 18, 1944 |
| 2,349,102 | Levenberg | May 16, 1944 |
| 2,365,614 | Winkler et al. | Dec. 19, 1944 |
| 2,376,801 | Mitchell | May 22, 1945 |
| 2,390,807 | Naysmith | Dec. 11, 1945 |
| 2,391,325 | Maurette | Dec. 18, 1945 |